United States Patent
Ghosh et al.

(10) Patent No.: US 9,706,534 B2
(45) Date of Patent: Jul. 11, 2017

(54) APPARATUS, METHOD, AND COMPUTER READABLE MEDIA FOR UPLINK TRANSMISSION OPPORTUNITY IN A HIGH-EFFICIENCY WIRELESS LOCAL-AREA NETWORK

(71) Applicant: Intel IP Corporation, Santa Clara, CA (US)

(72) Inventors: Chittabrata Ghosh, Fremont, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 41 days.

(21) Appl. No.: 14/671,489

(22) Filed: Mar. 27, 2015

(65) Prior Publication Data

US 2016/0165588 A1 Jun. 9, 2016

Related U.S. Application Data

(60) Provisional application No. 62/087,042, filed on Dec. 3, 2014.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0007* (2013.01); *H04L 45/74* (2013.01);
(Continued)

(58) Field of Classification Search
CPC ....... H04L 45/74; H04L 5/0007; H04L 69/22; H04W 72/0413; H04W 84/12
(Continued)

(56) References Cited

U.S. PATENT DOCUMENTS

2009/0310692 A1 12/2009 Kafle et al.
2010/0046454 A1* 2/2010 Wentink .............. H04W 74/006
370/329
(Continued)

FOREIGN PATENT DOCUMENTS

DE 102015118115 A1 6/2016
WO WO-2016089537 A1 6/2016

OTHER PUBLICATIONS

"International Application Serial No. PCT/US2015/059172, International Search Report mailed Feb. 18, 2016", 3 pgs.
(Continued)

*Primary Examiner* — Luat Phung
*Assistant Examiner* — Saad A Waqas
(74) *Attorney, Agent, or Firm* — Schwegman Lundberg & Woessner, P.A.

(57) ABSTRACT

Methods, devices and a computer-readable medium are disclosed for an uplink transmission opportunity in a high-efficiency wireless local-area network (HEW) are disclosed. A HEW station is disclosed that may include circuitry configured to receive a trigger frame with a first duration from a HEW master station, determine a second duration based on the first duration, generate a packet with the second duration, and transmit the packet with the second duration in an uplink transmission opportunity to the master station in accordance with at least one from the following group: orthogonal frequency division multiple-access and multiple-user multiple-input multiple-output. The trigger frame may include a resource map and the HEW station may transmit the packet on a channel indicated in the resource map. The second duration may be indicated in a legacy portion of the packet. The second duration may extend to one short inter-frame space before an acknowledgement of the packet.

18 Claims, 9 Drawing Sheets

(51) Int. Cl.
*H04L 12/741* (2013.01)
*H04L 29/06* (2006.01)
*H04B 7/0452* (2017.01)
*H04W 84/12* (2009.01)

(52) U.S. Cl.
CPC ........... *H04L 69/22* (2013.01); *H04W 72/042* (2013.01); *H04B 7/0452* (2013.01); *H04W 72/0453* (2013.01); *H04W 84/12* (2013.01)

(58) Field of Classification Search
USPC ........................................................ 370/392
See application file for complete search history.

(56) References Cited

U.S. PATENT DOCUMENTS

| | | | | |
|---|---|---|---|---|
| 2012/0063433 | A1* | 3/2012 | Wentink | H04W 76/02 370/338 |
| 2012/0236840 | A1* | 9/2012 | Kim | H04W 74/0816 370/338 |
| 2013/0155931 | A1* | 6/2013 | Prajapati | H04W 72/044 370/311 |
| 2014/0079016 | A1 | 3/2014 | Dai et al. | |
| 2014/0153512 | A1* | 6/2014 | Koskela | H04L 1/00 370/329 |
| 2015/0131517 | A1* | 5/2015 | Chu | H04W 72/005 370/312 |
| 2015/0146808 | A1* | 5/2015 | Chu | H04L 5/0037 375/260 |
| 2015/0172011 | A1* | 6/2015 | Aboul-Magd | H04L 5/0007 370/330 |
| 2015/0319747 | A1* | 11/2015 | Chu | H04W 72/0406 370/330 |
| 2016/0088600 | A1* | 3/2016 | Yang | H04W 72/044 370/329 |

OTHER PUBLICATIONS

"International Applicaition Serial No. PCT/US2015/059172, Written Opinion mailed Feb. 18, 2016", 8 pgs.

* cited by examiner

APPARATUS, METHOD, AND COMPUTER READABLE MEDIA FOR UPLINK TRANSMISSION OPPORTUNITY IN A HIGH-EFFICIENCY WIRELESS LOCAL-AREA NETWORK

PRIORITY CLAIM

This application claims the benefit of priority under 35 USC 119(e) to U.S. Provisional Patent Application Ser. No. 62/087,042, filed Dec. 3, 2014, which is incorporated herein by reference in its entirety.

TECHNICAL FIELD

Embodiments pertain to high-efficiency local-area wireless network (HEW), and some embodiments relate to Institute of Electrical and Electronic Engineers (IEEE) 802.11ax. Some embodiments relate to an orthogonal frequency division multiple-access (OFDMA) and/or MU-MIMO transmission opportunity. Some embodiments relate to HEW stations setting a duration of a packet within a transmission opportunity to defer other wireless devices and to HEW stations not transmitting for the full transmission opportunity.

BACKGROUND

Wireless devices communicate with one another using a wireless medium. The resources of the wireless medium are often limited, and the users of the wireless devices often demand faster communication from the wireless medium. Additionally, often users demand lower power use and longer battery life from the wireless devices.

Moreover, often more than one standard may be in use in a wireless local-area network (WLAN). For example, IEEE 802.11ax, referred to as high-efficiency wireless local-area networks (HEW) (WLAN), may need to be used with legacy versions of IEEE 802.11.

Therefore, there are general needs in the art to improve the operation and/or efficiency of communication between wireless devices and to lower the power use of wireless devices.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
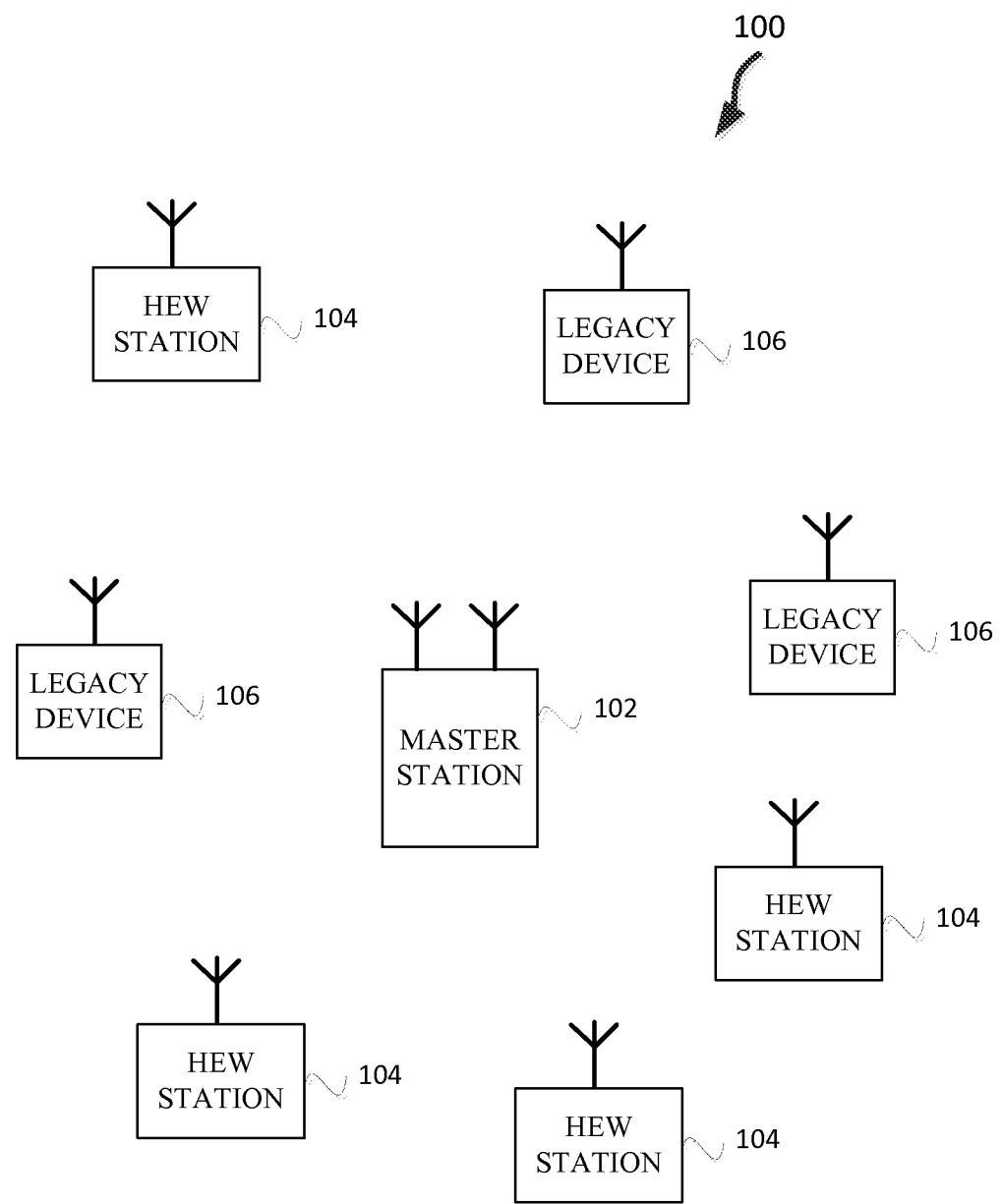
FIG. 1 illustrates a wireless network in accordance with some embodiments.

FIG. 1 illustrates a wireless local-area network (WLAN) in accordance with some embodiments. The WLAN may comprise a basis service set (BSS) 100 that may include a master station 102, which may be an access point (AP); a plurality of high-efficiency wireless (HEW) (e.g., IEEE 802.11ax) stations 104; and a plurality of legacy (e.g., IEEE 802.11n/ac) devices 106.

The master station 102 may be an access point (AP) using the 802.11 protocol to transmit and receive. The master station 102 may be a base station. The master station 102 may be an IEEE 802.11 master station. The master station 102 may be a HEW master station. The master station 102 may use other communications protocols as well as the 802.11 protocol. The 802.11 protocol may be 802.11ax. The 802.11 protocol may include using Orthogonal Frequency-Division Multiple Access (OFDMA), time division multiple access (TDMA), and/or code division multiple access (CDMA). The 802.11 protocol may include a multiple access technique. For example, the 802.11 protocol may include space-division multiple access (SDMA) and/or multi-user (MU) multiple-input and multiple-output (MIMO)(MU-MIMO).

The HEW stations 104 may operate in accordance with 802.11ax or another standard of 802.11. The legacy devices 106 may operate in accordance with one or more of 802.11a/g/ag/n/ac, or another legacy wireless communication standard. The HEW stations 104 may be high efficiency (HE) stations. The legacy devices 106 may be stations.

The HEW stations 104 may be wireless transmit and receive devices such as a cellular telephone, a handheld wireless device, wireless glasses, a wireless watch, a wireless personal device, a tablet, or another device that may be transmitting and receiving using the 802.11 protocol such as 802.11ax or another wireless protocol.

The BSS 100 may operate on a primary channel and one or more secondary channels or sub-channels. The BSS 100 may include one or more master stations 102. In accordance with embodiments, the master station 102 may communicate with one or more of the HEW stations 104 on one or more of the secondary channels or sub-channels or the primary channel. In example embodiments, the master station 102 communicates with the legacy devices 106 on the primary channel. In example embodiments, the master station 102 may be configured to communicate concurrently with one or more of the HEW stations 104 on one or more of the secondary channels and one or more of the legacy devices 106 utilizing only the primary channel and not utilizing any of the secondary channels.

The master station 102 may communicate with the legacy devices 106 in accordance with legacy IEEE 802.11 communication techniques. In example embodiments, the master station 102 may also be configured to communicate with the HEW stations 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have a same bandwidth as a channel or sub-channel and the bandwidth may be one of 20 MHz, 40 MHz, 80 MHz, 160 MHz, or 320 MHz contiguous bandwidth or an 80+80 MHz (160 MHz) non-contiguous bandwidth. In some embodiments, bandwidths of 1 MHz, 1.25 MHz, 2.5 MHz, 5 MHz, and 10 MHz, or a combination thereof, may also be used. In example embodiments, a channel or sub-channel may be any size less or equal to the bandwidth available. In example embodiments, the sub-channel or channel may be non-contiguous. A HEW frame may be configured for transmitting a number of spatial streams.

In other embodiments, the master station 102, HEW station 104, and/or legacy device 106 may also implement different technologies, such as CDMA2000, CDMA2000 1X, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (Wi-MAX)), BlueTooth®, or other technologies.

In an OFDMA system (e.g., 802.11ax), an associated HEW station 104 may operate on a sub-channel, which may be 20 MHz, of the BSS 100 (that can operate, for example, at 80 MHz). The HEW station 104 may enter a power save mode, and upon coming out of the power save mode, the HEW station 104 may need to re-synchronize with the BSS 100 by receiving a beacon. If the beacon is transmitted only on the primary channel, then the HEW station 104 needs to move and tune to the primary channel upon coming out of the power save mode to be able to receive the beacon. Then the HEW station 104 needs to re-tune back to its operating sub-channel, which may be 20 MHz, or it has to follow a handshake procedure to let the master station 102 know of a new operating sub-channel. The HEW station 104 may risk losing some frames during the channel switch, in example embodiments.

In example embodiments, the HEW station 104 and/or the master station 102 are configured to generate, transmit, receive, and operate in accordance with a trigger frame and/or frames within a transmission opportunity according to one or more of the embodiments disclosed herein in conjunction with FIGS. 1-8.

Some embodiments relate to high-efficiency wireless communications, including high-efficiency Wi-Fi/WLAN and HEW communications. In accordance with some IEEE 802.11ax (HEW) embodiments, the master station 102 may operate as a master station which may be arranged to contend for a wireless medium (e.g., during a contention period) to receive exclusive control of the medium for a HEW control period (i.e., a transmission opportunity (TXOP)). The master station 102 may transmit a HEW master-sync transmission or trigger frame at the beginning of the HEW control period. The master station 102 may transmit a time duration of the TXOP. During the HEW control period, the HEW stations 104 may communicate with the master station 102 in accordance with a non-contention-based multiple access technique. This is unlike conventional WLAN communications in which devices communicate in accordance with a contention-based communication technique, rather than a multiple access technique. During the HEW control period, the master station 102 may communicate with the HEW stations 104 using one or more HEW frames. During the HEW control period, the legacy devices 106 may refrain from communicating. In some embodiments, the HEW master-sync transmission may be referred to as a HEW control and schedule transmission or trigger frame.

In some embodiments, the multiple-access technique used during the HEW control period may be a scheduled OFDMA technique, although this is not a requirement. In some embodiments, the multiple access technique may be a TDMA technique or a frequency division multiple access (FDMA) technique. In some embodiments, the multiple access technique may be an SDMA technique.

The master station 102 may also communicate with the legacy devices 106 in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

Figure 2:
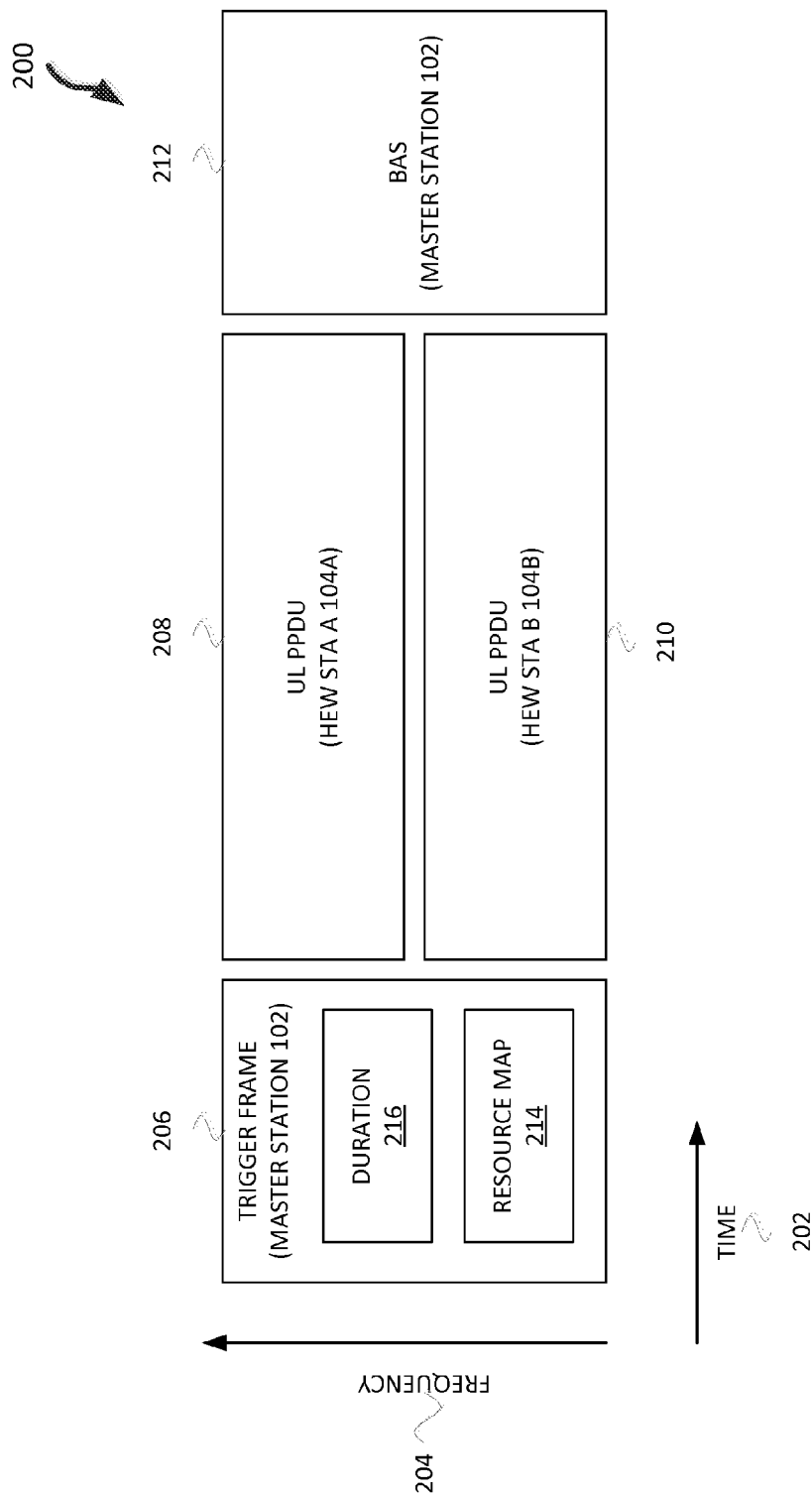
FIG. 2 illustrates a method for an uplink (UL) transmission opportunity where OFDMA is used to share the wireless medium in accordance with some embodiments.

FIG. 2 illustrates a method 200 for an uplink (UL) transmission opportunity where OFDMA is used to share the wireless medium in accordance with some embodiments. Illustrated in FIG. 2 is time 202 along a horizontal axis, frequency 204 along a vertical axis, a trigger frame 206, an UL PPDU 208, an UL PPDU 210, and block acknowledgements (BAs) 212. The transmitter of the packet is illustrated in parentheses. For example, master station 102 transmits trigger frame 206 and HEW STA A 104A transmits UL PPDU 208. The trigger frame 206 may include a resource map 214. The resource map 214 may include an indication of one or more sub-channels for HEW STA A 104A and HEW STA B 104B to transmit on in the UL transmission opportunity. The trigger frame 206 may be transmitted by a master station 102. The master station 102 may be a master station 102 as described in conjunction with FIG. 1. HEW STA A 104A and HEW STA B 104B may be HEW stations 104 as described in conjunction with FIG. 1. HEW STA A 104A and HEW STA B 104B may receive the trigger frame 206.

The method 200 may continue at operations 208, 210 with HEW STA A 104A transmitting UL PPDU 208 and HEW STA B 104B transmitting UL PPDU 210. HEW STA A 104A and HEW STA B 104B may transmit in accordance with OFDMA on different portions of the frequency 204 and in accordance with the resource map 214 and duration 216.

The method 200 may continue at operation BAS 212 with master station 102 transmitting block acknowledgements for UL PPDU 208 and UL PPDU 210. The method 200 may end or be repeated one or more times.

Figure 3:
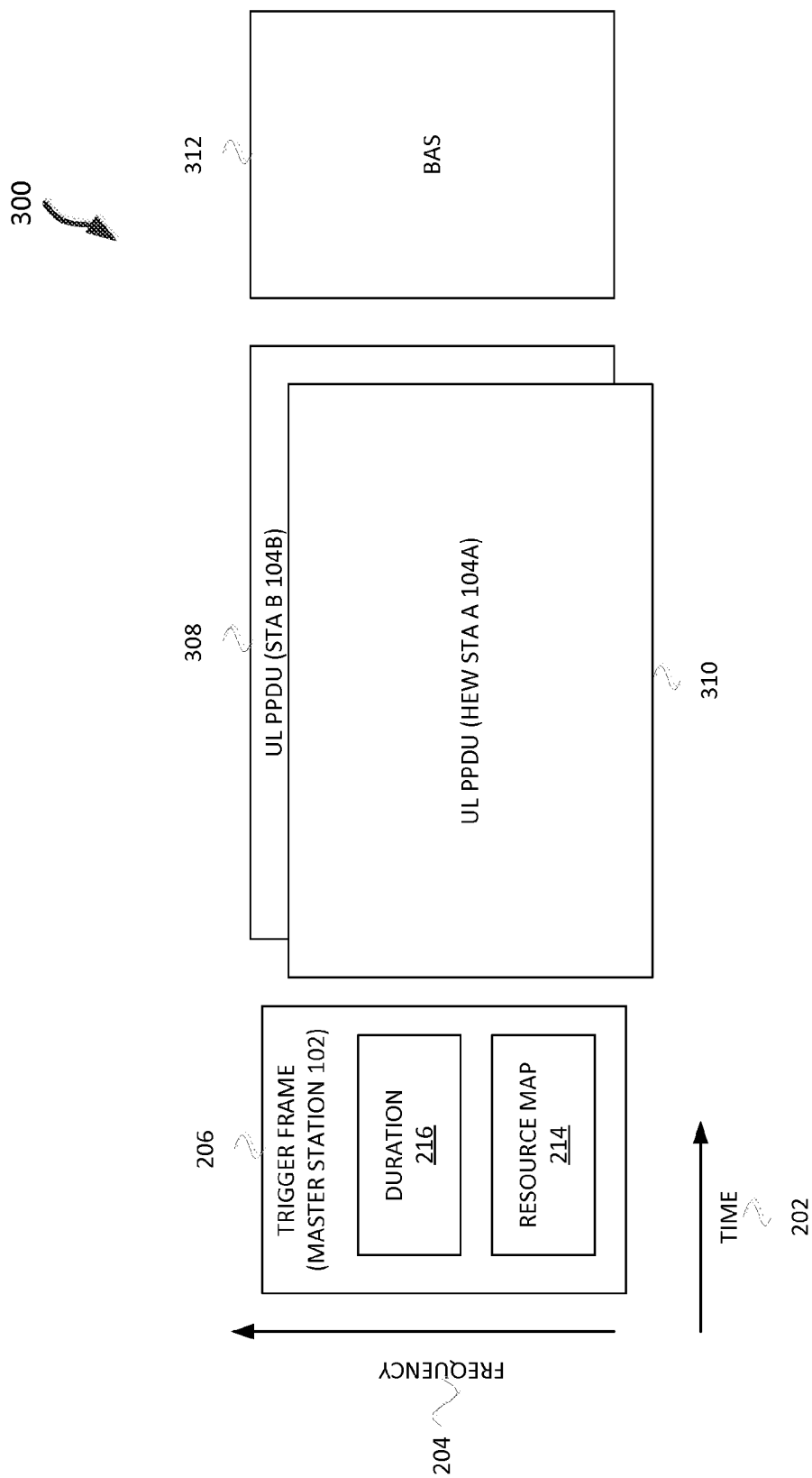
FIG. 3 illustrates a method for an UL transmission opportunity where MU-MIMO is used to share the wireless medium in accordance with some embodiments.

FIG. 3 illustrates a method 300 for an UL transmission opportunity where MU-MIMO is used to share the wireless medium in accordance with some embodiments. Illustrated in FIG. 3 is time 202 along a horizontal axis, frequency 204 along a vertical axis, a trigger frame 206, an UL PPDU 308, an UL PPDU 310, and BAs 312. The transmitter of the packet is illustrated in parentheses. For example, master station 102 transmits trigger frame 206 and HEW STA A 104A transmits UL PPDU 310. The trigger frame 206 may include a resource map 214. The resource map 214 may include an indication of one or more sub-channels and spatial diversity channels for HEW STA A 104A and HEW STA B 104B to transmit on in the UL transmission opportunity. The trigger frame 206 may be transmitted by a master station 102. The master station 102 may be a master station 102 as described in conjunction with FIG. 1. HEW STA A 104A and HEW STA B 104B may be HEW stations 104 as described in conjunction with FIG. 1. HEW STA A 104A and HEW STA B 104B may receive the trigger frame 206.

The method 300 may continue at operations 308, 310 with HEW STA A 104A transmitting UL PPDU 308 and HEW STA B 104B transmitting UL PPDU 310. HEW STA A 104A and HEW STA B 104B may transmit in accordance with MU-MIMO on a same portion of the frequency 204 and in accordance with the resource map 214 and duration 216.

The method 300 may continue at operation BAS 312 with master station 102 transmitting BAs for UL PPDU 308 and UL PPDU 310. The method 300 may end or repeat one or more times.

Figure 4:
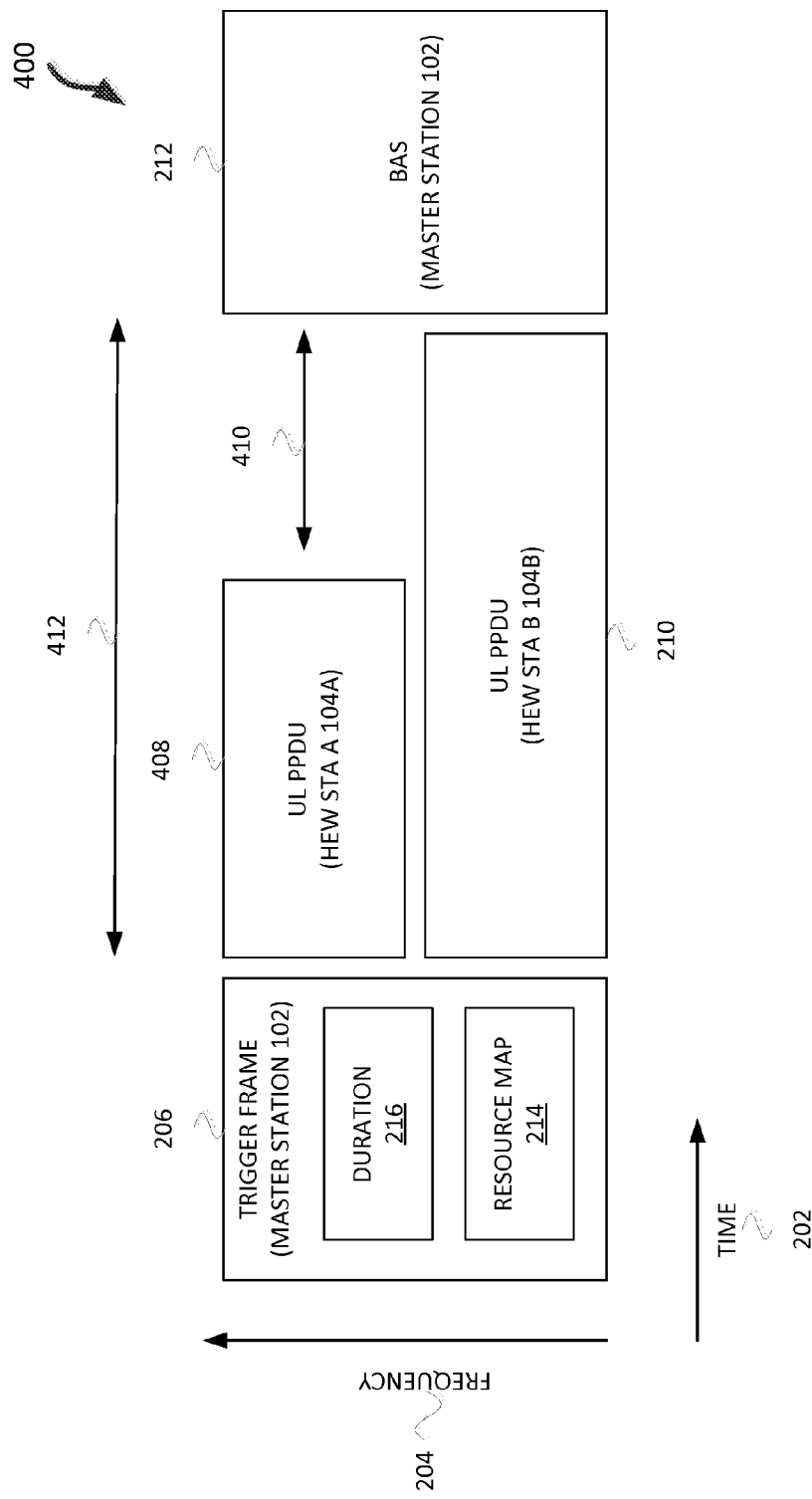
FIG. 4 illustrates a method for an UL transmission opportunity where OFDMA is used to share the wireless medium in accordance with some embodiments.

FIG. 4 illustrates a method 400 for an UL transmission opportunity where OFDMA is used to share the wireless medium in accordance with some embodiments. Illustrated in FIG. 4 is time 202 along a horizontal axis, frequency 204 along a vertical axis, a trigger frame 206, an UL PPDU 408, an UL PPDU 210, and BAs 212. The method 400 is similar to the method 200, but in the method 400 the HEW STA A 104A may not have enough data to transmit to the master station 102 to file the time 412 that could be used for UL PPDU 408. In example embodiments, the HEW STA A 104A does not transmit during time 410 which may leave the channel idle. A legacy device 106 and/or HEW STA 104 may gain access to the channel that is allocated to HEW STA A 104 during time 410, which may cause a problem. For example, the master station 102 may have to wait to transmit the BAs 212. The HEW STA A 104A and HEW STA B 104B may consume more energy waiting for the master station 102 to transmit the BAS 212.

Figure 5:
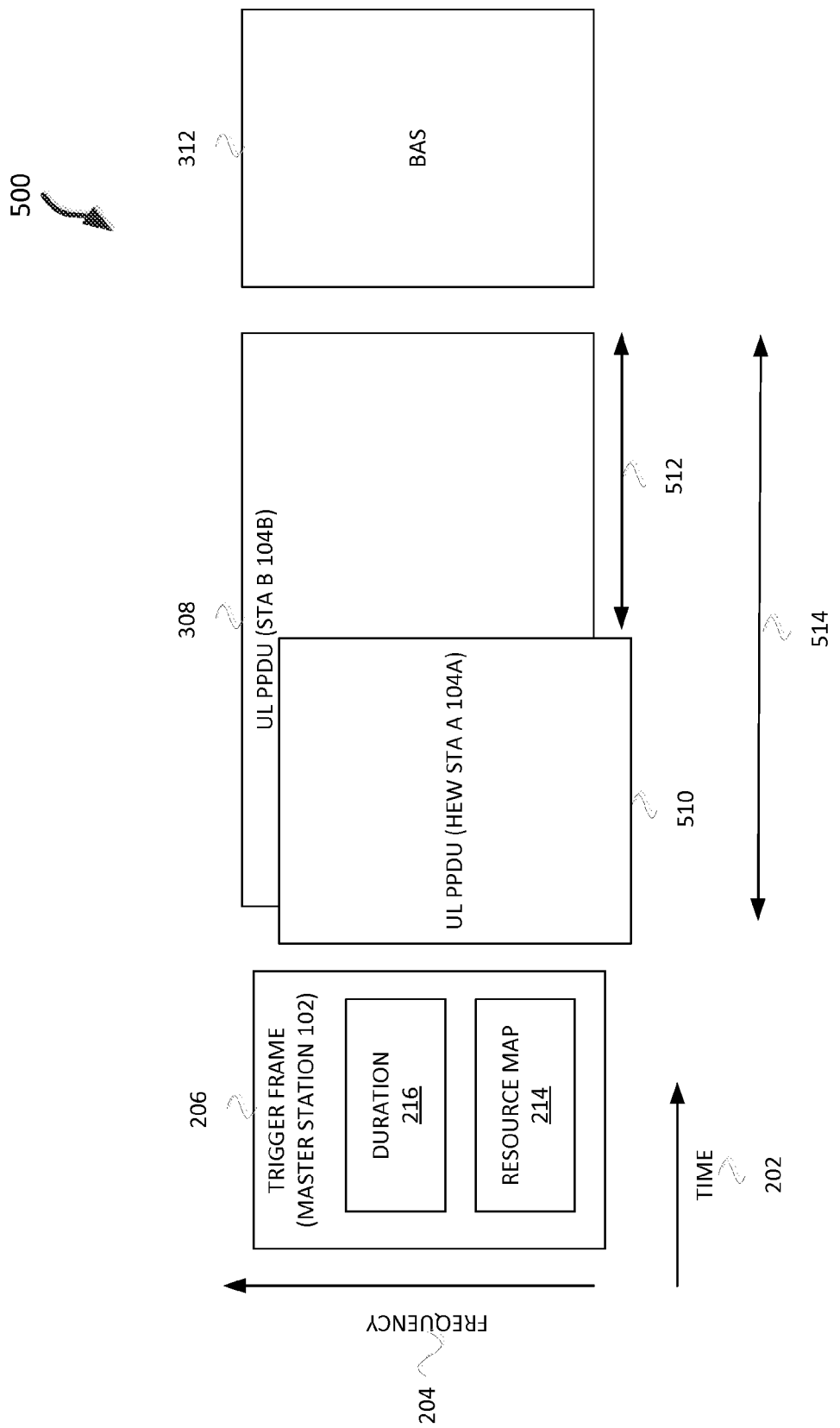
FIG. 5 illustrates a method for an UL transmission opportunity where MU-MIMO is used to share the wireless medium in accordance with some embodiments.

FIG. 5 illustrates a method 500 for an UL transmission opportunity where MU-MIMO is used to share the wireless medium in accordance with some embodiments. Illustrated in FIG. 5 is time 202 along a horizontal axis, frequency 204 along a vertical axis, a trigger frame 206, an UL PPDU 308, an UL PPDU 510, and BAs 312. The method 500 is similar to the method 200, but in the method 500 the HEW STA A 104A may not have enough data to transmit to the master station 102 to fill the time 514 that could be used for UL PPDU 510. In example embodiments, the HEW STA A 104A does not transmit during time 512 which may leave the channel idle. A legacy device 106 and/or HEW STA 104 may gain access to the channel that is allocated to HEW STA A 104 during time 512, which may cause a problem. For example, the master station 102 may have to wait to transmit the BAs 312. The HEW STA A 104A and HEW STA B 104B may consume more energy waiting for the master station 102 to transmit the BAs 312. The method 500 may end or be repeated one or more times.

Figure 6:
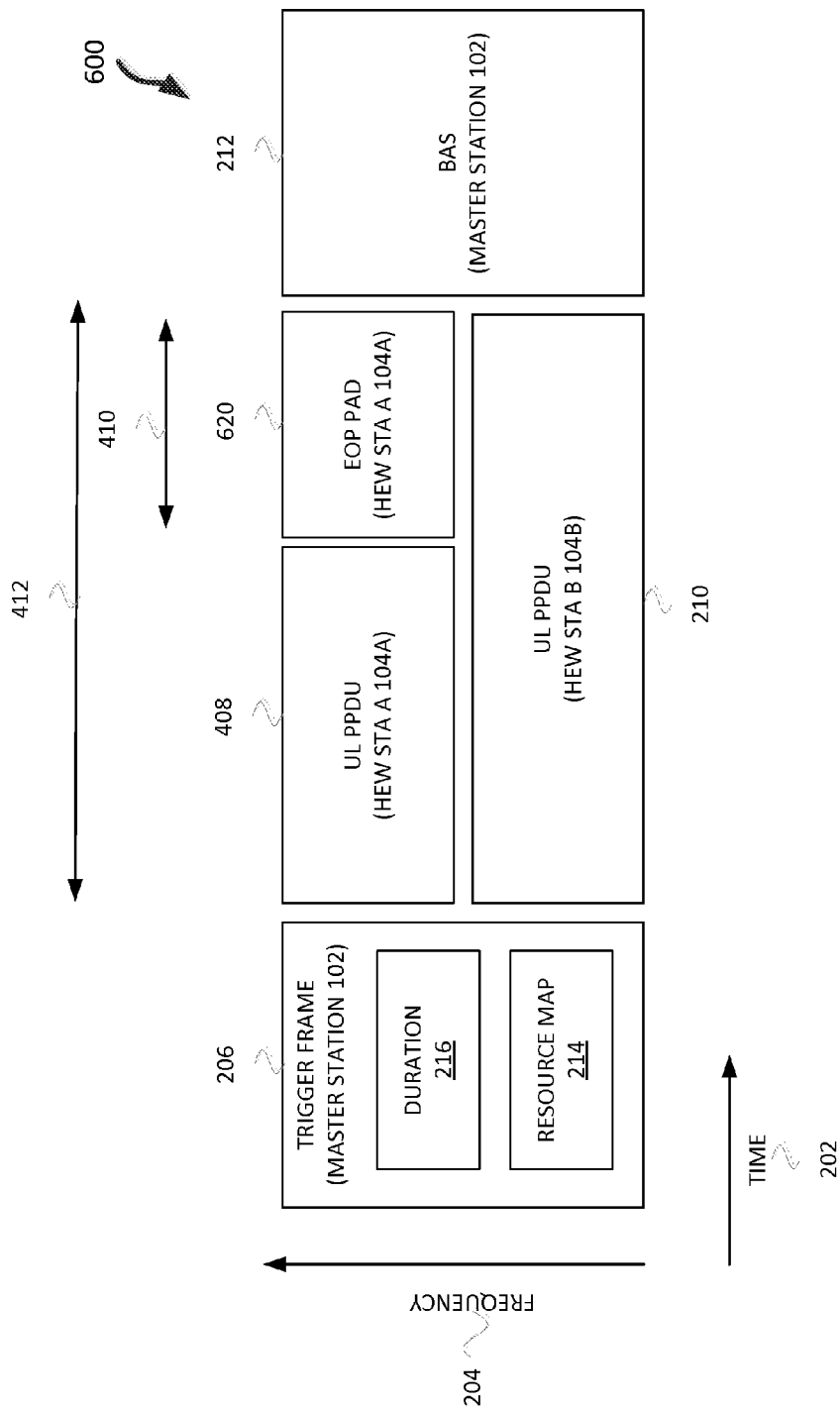
FIG. 6 illustrates a method for an UL transmission opportunity where OFDMA is used to share the wireless medium in accordance with some embodiments.

FIG. 6 illustrates a method 600 for an UL transmission opportunity where OFDMA is used to share the wireless medium in accordance with some embodiments. Illustrated in FIG. 6 is time 202 along a horizontal axis, frequency 204 along a vertical axis, a trigger frame 206, an UL PPDU 408, an UL PPDU 210, and BAs 212. The method 600 is similar to the method 400, but in the method 600 the HEW STA A 104A may not have enough data to transmit to the master station 102 to fill the time 412 that could be used for UL PPDU 408, but, in these embodiments, fills the time 410 with an EOP PAD 620. The EOP PAD 620 may be pad bits or pad packet to fill the time 410 so that no other legacy device 106 or HEW station 104 will transmit on the wireless medium. The master station 102 may decode the EOP PAD 620 which may consume energy. The HEW STA A 104A consumes energy transmitting the EOP PAD 620. The method 600 may end or be repeated one or more times.

Figure 7:
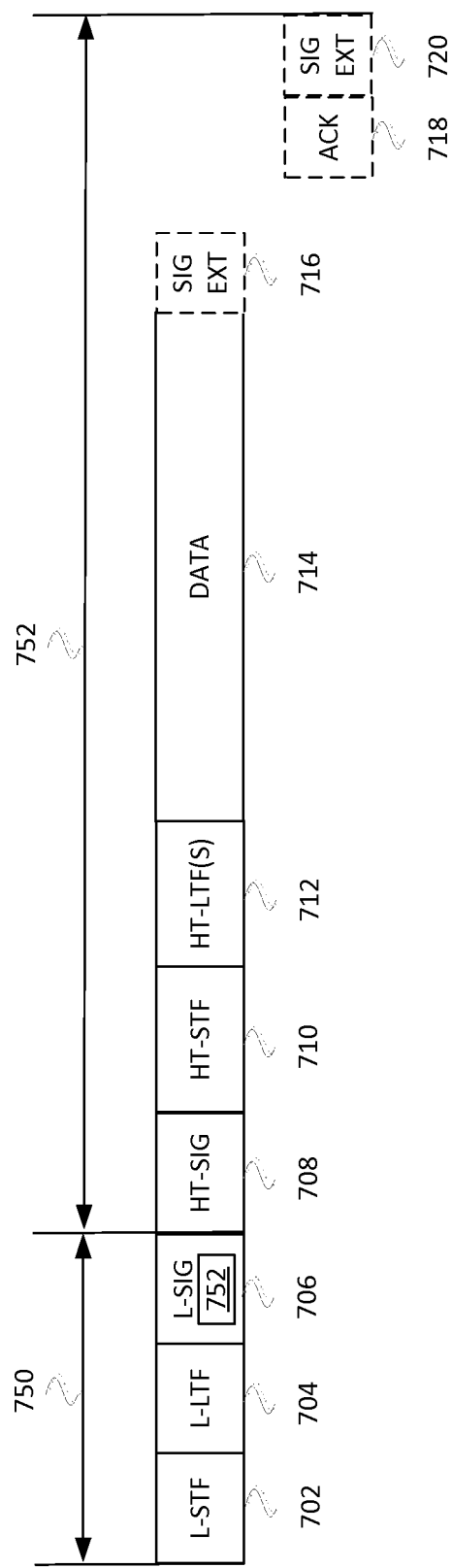
FIG. 7 illustrates a frame format of a physical layer convergence procedure (PLCP) protocol data unit (PPDU) and legacy signal (L-SIG) duration in accordance with some embodiments.

FIG. 7 illustrates a frame format of a physical layer convergence procedure (PLCP) protocol data unit (PPDU) and legacy signal (L-SIG) duration in accordance with some embodiments. Illustrated in FIG. 7 are a legacy short-training (L-STF) 702 field, a legacy long-training (L-LTF) 704 field, a L-SIG 706 field, high-throughput (HT) SIG 708 field, HT short-training (HT-STF) 710 field, one or more HT long-training (HT-LTF) 712 field(s), data 714, SIG extension (EXT) 716, acknowledgment (ACK) 718, SIG EXT 720, duration 750, and duration 752.

A duration 752 field in the L-SIG 706 may be set to duration 752. In example embodiments, the master station 102 may respond to a request for a transmission opportunity from a HEW station 104 and/or a legacy device 106. The master station 102 may then know the duration of the data the HEW station 104 and/or legacy device 106 will transmit. The duration 752 of the L-SIG 706 field may be set to a duration 752 that is equal to the MAC duration plus a duration of an initial PDDU—a preamble length—PHY header length plus a duration for the ACK 718 and SIG ext 720.

Figure 8:
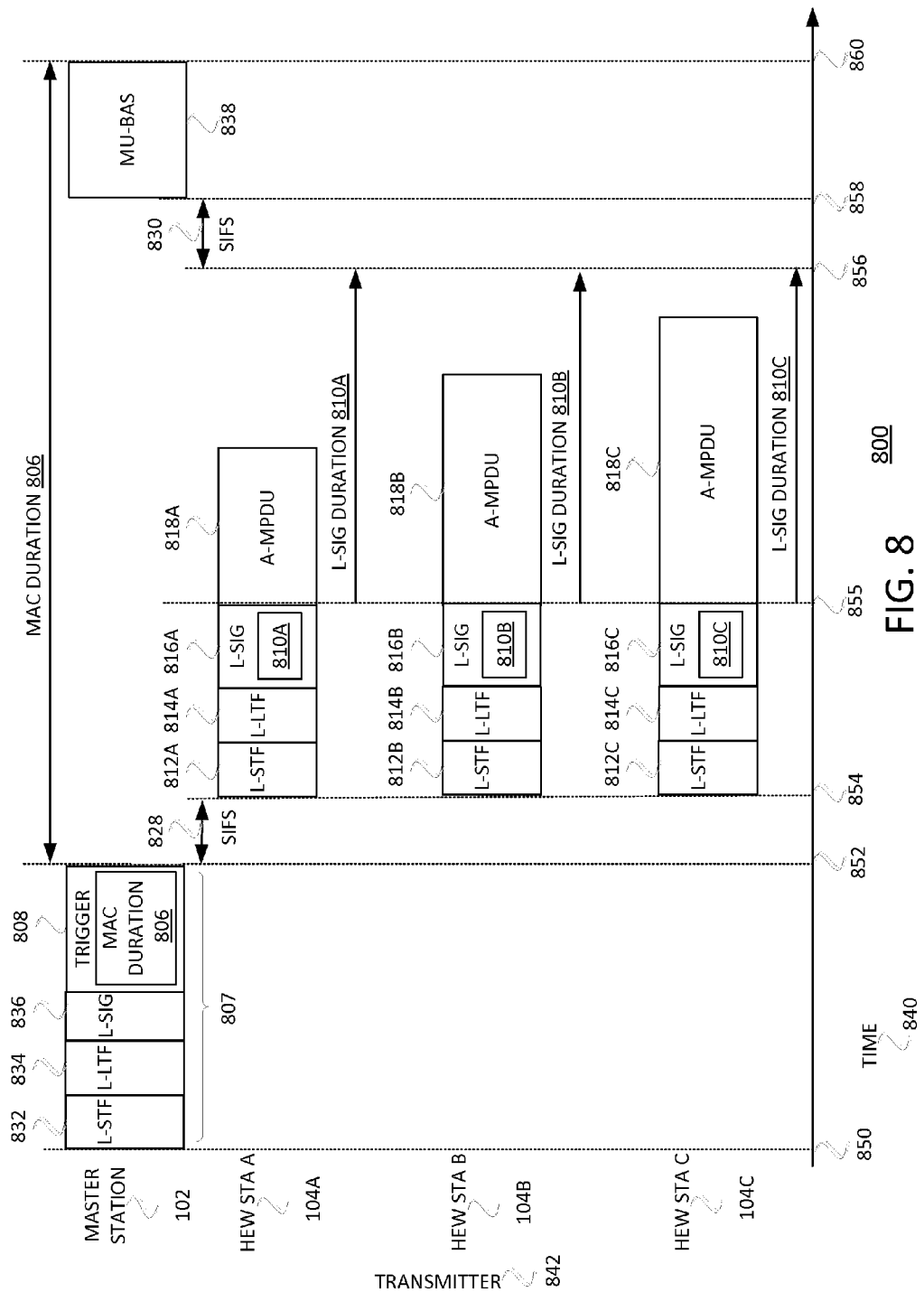
FIG. 8 illustrates a method for an uplink transmission opportunity in accordance with some embodiments.

FIG. 8 illustrates a method 800 for an uplink transmission opportunity in accordance with some embodiments. Illustrated in FIG. 8 is time 840 along the horizontal axis and the transmitter along the vertical axis 842. The transmitters are master station 102, HEW station (STA) A 104A, HEW STA B 104B, and HEW STA C 104C. The master station 102 may be a master station 102 as described in conjunction with FIG. 1. The HEW STA A 104A, HEW STA B 104B, and HEW STA C 104C may be HEW stations 104 as described in conjunction with FIG. 1, and may be transmitting in accordance with OFDMA and/or MU-MIMO.

The method 800 may begin at time 850 with the master station 102 transmitting a trigger frame 807. The trigger frame 807 may include L-STF 832, L-LTF 834, L-SIG 836, and trigger 808. In example embodiments, the trigger 808 may be termed a trigger frame. The L-STF 832 may be a legacy short-training field. The L-LTF 834 may be a legacy long-training field. The L-SIG 836 may be a legacy signal field. The trigger 808 may be a frame such as a media access control (MAC) Protocol Data Unit (MPDU) or aggregate MPDU (A-MPDU).

The trigger 808 may include a MAC duration 806 and a resource map (not illustrated). The resource map may indicate allocations such as sub-channels for the HEW STAs 104. The MAC duration 806 may be a duration that indicates the length of the transmission opportunity. For example, the transmission opportunity may begin at time 854 and go to time 856. In example embodiments, the transmission opportunity may be considered to have a different beginning and ending. For example, the transmission opportunity may be considered to start at time 850 and end at time 860, or, as another example, may include SIFS 828 and/or SIFS 830. The master station 102 may determine the MAC duration 806 based on information received from the HEW STAs 104. For example, the master station 102 may determine that the HEW STAs 104 have a signification amount of data to transmit to the master station 102 and set the MAC duration 806 to reserve the time for use by the HEW STAs 104 to transmit uplink data to the master station 102. Legacy devices 106 may defer use of the wireless medium based on the MAC duration 806.

The method 800 may continue at time 852 where the HEW STAs 104 may wait a period of time before beginning the uplink transmission. The period of time may be a short interframe space (SIFS) period 828, which may be a time such as 10 μseconds (s) or 16 μs. The HEW STAs 104 may wait a different period of time before transmitting, in some embodiments.

The method 800 may continue at time 854 with the HEW STAs 104 transmitting uplink data according to the resource map. For example, HEW STA A 104A may transmit L-STF 812A, L-LTF 814A, L-SIG 816A, and A-MPDU 818A. The HEW STAs 104 may transmit simultaneously in accordance with OFDMA and/or MU-MIMO. The frequencies or sub-channels the HEW STAs 104 use are determined based on the resource map. The L-SIG 816 may include a L-SIG duration 810

The HEW STAs 104 may determine a L-SIG duration 810 based on the trigger frame 807. For example, the HEW STAs 104 may determine the L-SIG duration 810 based on the MAC duration 806. In some embodiments, the HEW STAs 104 may determine the L-SIG duration 810 as the MAC duration 302 minus the time for the two SIFS 828, 830, minus the time for the MU-BAS 838 (time 858 to time 860), and/or minus the time for the preamble which may include L-STF 812, L-LTF 814, and L-SIG 816. The HEW STAs 104 may have pre-stored the time for the master station 102 to send a MU-BAS 838, or the HEW STAs 104 may determine the time or receive the time from the master station 102. In example embodiments, the HEW STAs 104 may determine the L-SIG duration 810 based on a duration in the resource map that indicates how long the HEW STAs 104 has to transmit data. In example embodiments, setting the L-SIG duration 810 to time 856 may defer any other HEW STAs 104 or legacy stations 106 from participating in the transmission opportunity. In some embodiments, the L-SIG duration 810 may be set to go to time 858 or time 860.

The HEW STAs 104, thus, may be able to not transmit from the time the A-MPDU 818 is finished until 856 without other devices contending for the wireless medium. In example embodiments, the master station 102 may anticipate the HEW STAs 104 setting the L-SIG duration 810 until time 856. The master station 102 may wait until time 858 to transmit MU-BAS 838 to permit the HEW STAs 104 to potentially use the entire time up until time 856 to transmit data.

The HEW STAs 104 may transmit A-MPDU 818 at time 855. The A-MPDUs 818 may contain data for the master station 102. The A-MPDU 818 may end at different times based on how much data the HEW STA 104 transmits to the master station 102.

The method 800 may continue at time 856 with the period of time over the HEW STAs 104 to transmit data. The master station 102 may wait a SIFS 830 time before transmitting the MU-BAS 838. The method 800 may continue at 858 with the master station 102 transmitting MU-BAS 838. The MU-BAS 838 may be multi-user block acknowledgements. The MU-BAS 838 may be, in some embodiments, acknowledgements. The method 800 may then end at 860. The transmission opportunity is over and the master station 102 and/or HEW STAs 104 may contend for the wireless medium. In example embodiments, the method 800 may repeat one or more times. In example embodiments, the master station 102 may extend the transmission opportunity by setting another MAC duration in the MU-BAs 838.

In example embodiments, the HEW STAs 104 setting the L-SIG duration 810 to time 856 and not transmitting from the end of the A-MPDU 818 until time 856 may save power both at the HEW STA 104 and the master station 102. In some embodiments, the HEW STA 104 may enter a power save mode after the transmission of A-MPDU 818 and wake up at time 856 or 858. In example embodiments, the HEW STAs 104 may transmit the L-SIG 816 on at least one other channel that is not indicated in the resource map to defer legacy devices. For example, a HEW STA 104 may transmit the L-SIG 816 on a primary channel that legacy devices 106 may be tuned to.

Figure 9:
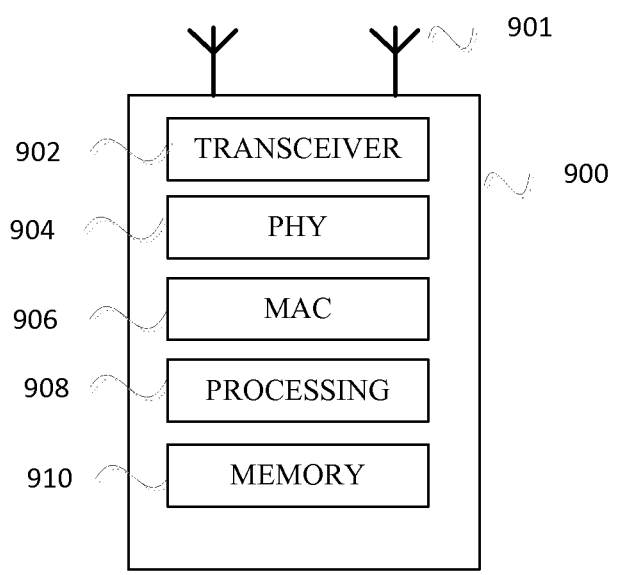
FIG. 9 illustrates a HEW station and/or master station, in accordance with some embodiments.

FIG. 9 illustrates a HEW station and/or master station 900 in accordance with some embodiments. The HEW station and/or master station 900 may be a HEW compliant device that may be arranged to communicate with one or more other HEW devices, such as the HEW stations 104 (FIG. 1) or the master station 102 (FIG. 1), as well as to communicate with the legacy devices 106 (FIG. 1). The HEW stations 104 and master station 102 may also be referred to as HEW devices. The HEW station and/or master station 900 may be suitable for operating as the master station 102 (FIG. 1) or a HEW station 104 (FIG. 1). In accordance with embodiments, the HEW station and/or master station 900 may include, among other things, a transmit/receive element such as an antenna 901, a transceiver 902, physical layer circuitry (PHY) 904, and medium-access control layer circuitry (MAC) 906. The PHY 904 and MAC 906 may be HEW compliant layers and may also be compliant with one or more legacy IEEE 902.11 standards. The MAC 906 may be arranged to configure physical protocol data units (PPDUs) and arranged to transmit and receive PPDUs, among other things. The HEW station and/or master station 900 may also include other circuitry 908 and memory 910 configured to perform the various operations described herein. The circuitry 908 may be hardware processing circuitry. The circuitry 908 may be coupled to the transceiver 902, which may be coupled to the transmit/receive element 901. While FIG. 9 depicts the circuitry 908 and the transceiver 902 as separate components, the circuitry 908 and the transceiver 902 may be integrated together in an electronic package or chip.

In some embodiments, the MAC 906 may be arranged to contend for a wireless medium during a contention period to receive control of the medium for the HEW control period and configure a HEW PPDU. In some embodiments, the MAC 906 may be arranged to contend for the wireless medium based on channel contention settings, a transmitting power level, and a clear channel assessment (CCA) level.

The PHY 904 may be arranged to transmit the HEW PPDU. The PHY 904 may include circuitry for modulation/demodulation, upconversion/downconversion, filtering, amplification, etc. In some embodiments, the hardware processing circuitry 908 may include one or more processors. The hardware processing circuitry 908 may be configured to perform functions based on instructions being stored in a RAM or ROM, or based on special purpose circuitry. In some embodiments, the hardware processing circuitry 908 may be configured to generate, transmit, receive, and operate in accordance with the trigger frame and/or transmission opportunity according to one or more of the embodiments disclosed herein in conjunction with FIGS. 1-8 such as a HEW device 104 setting a duration during a transmission opportunity.

In some embodiments, two or more antennas 901 may be coupled to the PHY 904 and arranged for sending and receiving signals including transmission of HEW packets. The transceiver 902 may transmit and receive data such as HEW PPDUs and packets that include an indication that the HEW station and/or master station 900 should adapt the channel contention settings according to settings included in the packet. The memory 910 may store information for configuring the other circuitry to perform operations for generating, transmitting, receiving, and operating in accordance with the trigger frame and transmission opportunity according to one or more of the embodiments disclosed herein in conjunction with FIGS. 1-8 such as a HEW device 104 setting a duration.

In some embodiments, the HEW station and/or master station 900 may be configured to communicate using OFDMA communication signals over a multicarrier communication channel. In some embodiments, the HEW station and/or master station 900 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the disclosed embodiments is not limited in this respect, as the HEW station and/or master station 900 may also be suitable to transmit and/or receive communications in accordance with other techniques and standards. In some embodiments, the HEW station and/or master station 900 may use 4× symbol duration of 802.11n or 802.11ac.

In some embodiments, the HEW station and/or master station 900 may be part of a portable wireless communication device or mobile device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a base station, a transmit/receive device for a wireless standard such as 802.11 or 802.16, or another device that may receive and/or transmit information wirelessly. In some embodiments, the portable wireless communication device may include one or more of a keyboard, a display, a non-volatile memory port, multiple antennas 901, a graphics processor, an application processor, speakers, and other portable wireless communication device elements. The display may be an LCD screen including a touch screen.

The antennas 901 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 901 may be effectively separated to take advantage of spatial diversity and the different channel characteristics that may result.

Although the HEW station and/or master station 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The following examples pertain to further embodiments. Example 1 is a high-efficiency wireless local-area network (HEW) station. The HEW station may include circuitry configured to: receive a trigger frame from a HEW master station, wherein the trigger frame includes a first duration; determine a second duration based on the first duration; generate a packet including a field that indicates the second duration; and transmit the packet including the field that indicates the second duration in an uplink transmission opportunity to the master station in accordance with at least one from the following group: orthogonal frequency division multiple-access (OFDMA) and multiple-user multiple-input multiple-output (MU-MIMO).

In Example 2, the subject matter of Example 1 can optionally include where the field that indicates the second duration is one of the following group: a legacy signal field, media access control duration of a media access control (MAC) Protocol Data Unit (MPDU), and an aggregate MPDU (A-MPDU).

In Example 3, the subject matter of Examples 1 or 2 can optionally include where the trigger frame includes a resource map and wherein the circuitry is further configured to transmit the packet on a channel indicated in the resource map.

In Example 4, the subject matter of any of Examples 1-3 can optionally include where the second duration is the first duration minus a duration for a preamble duration, a physical header duration, two short interframe spaces duration, and a multi-user block acknowledgement duration, and where the preamble duration is a duration of a preamble of the packet and the physical header duration is a duration of a physical header of the packet.

In Example 5, the subject matter of any of Examples 1-4 can optionally include where the second duration is determined to extend to one short interframe space before the master station transmits an acknowledgement of the packet.

In Example 6, the subject matter of any of Examples 1-5 can optionally include where the second duration is determined to extend to an end of a largest duration the packet is permitted to be for the transmission opportunity.

In Example 7, the subject matter of any of Examples 1-6 can optionally include where the trigger frame is transmitted to a plurality of HEW stations by the master station.

In Example 8, the subject matter of any of Examples 1-7 can optionally include where the circuitry is further configured to enter a power saving mode after the packet is transmitted and to awake from the power saving mode after the second duration.

In Example 9, the subject matter of any of Examples 1-8 can optionally include where the circuitry is further configured to enter the power saving mode if the packet is a predetermined duration shorter than the second duration.

In Example 10, the subject matter of any of Examples 1-9 can optionally include where the packet includes a legacy short-training field (L-STF), a legacy long-training field (L-LTF), a legacy signal field (L-SIG), and a media access control duration of an aggregate media access control (MAC) Protocol Data Unit (MPDU).

In Example 11, the subject matter of any of Examples 1-10 can optionally include where the master station does not know an amount of data the HEW station has to transmit in the packet.

In Example 12, the subject matter of any of Examples 1-11 can optionally include where the trigger frame includes a resource map and wherein the circuitry is further configured to transmit the packet on a channel indicated in the resource map and on at least one other channel to defer legacy devices.

In Example 13, the subject matter of any of Examples 1-12 can optionally include where the second duration is indicated in a legacy portion of the packet.

In Example 14, the subject matter of any of Examples 1-13 can optionally include where the circuitry is further configured to: transmit with a 4× symbol duration compared with an Institute of Electronic and Electrical Engineers (IEEE) 802.11ac symbol duration.

In Example 15, the subject matter of any of Examples 1-14 can optionally include memory coupled to the circuitry.

In Example 16, the subject matter of any of Examples 1-14 can optionally include one or more antennas coupled to the circuitry.

In Example 17 is a method performed by high-efficiency wireless local-area network (HEW) station. The method including receiving a trigger frame from a HEW master station, wherein the trigger frame includes a first duration; determining a second duration based on the first duration; generating a packet with the second duration; and transmitting the packet with the second duration in an uplink transmission opportunity to the master station in accordance with at least one from the following group: orthogonal frequency division multiple-access (OFDMA) and multiple-user multiple-input multiple-output (MU-MIMO).

In Example 18, the subject matter of Example 17 can optionally include where the trigger frame includes a resource map and wherein the circuitry is further configured to transmit the packet on a channel indicated in the resource map.

In Example 19, the subject matter of Examples 17 or 18 can optionally include where the second duration is the first duration minus a duration for a preamble length, a physical header duration, two short interframe spaces duration, and a multi-user block acknowledgement duration, and where the preamble duration is a duration of a preamble of the packet and the physical header duration is a duration a physical header of the packet.

In Example 20, the subject matter of any of Examples 17-19 can optionally include where the second duration is determined to extend to one short interframe space before the master station transmits an acknowledgement of the packet.

In Example 21, the subject matter of any of Examples 17-20 can optionally include where the second duration is determined to extend to an end of a largest duration the packet is permitted to be for the transmission opportunity.

In Example 22, the subject matter of any of Examples 17-21 can optionally include where the second duration is indicated in a legacy portion of the packet.

Example 23 is a non-transitory, computer-readable storage medium that stores instructions for execution by one or more processors to perform operations for communication by a high-efficiency wireless local-area network (HEW) station. The instructions to configure the one or more processors to cause the HEW station to: receive a trigger frame from a HEW master station, wherein the trigger frame includes a first duration; determine a second duration based on the first duration; generate a packet with the second duration; and transmit the packet with the second duration in an uplink transmission opportunity to the master station in accordance with at least one from the following group: orthogonal frequency division multiple-access (OFDMA) and multiple-user multiple-input multiple-output (MU-MIMO).

In Example 24, the subject matter of Example 24 can optionally include where the trigger frame includes a resource map and wherein the circuitry is further configured to transmit the packet on a channel indicated in the resource map.

In Example 25, the subject matter of Examples 23 or 24 can optionally include where the second duration is the first duration minus a duration for a preamble length, a physical header duration, minus two short interframe spaces duration, and a multi-user block acknowledgement duration, and where the preamble duration is a duration of a preamble of the packet and the physical header duration is a duration a physical header of the packet.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station configured to operate in a wireless local-area network (WLAN), the HE station comprising: memory; and circuitry coupled to the memory, the circuitry configured to:
    receive a trigger frame from a HE master station, wherein the trigger frame comprises a first duration and a resource map;
    determine a second duration based on the first duration;
    generate a packet including a field that indicates the second duration, wherein the second duration is indicated in a legacy portion of the packet;
    configure the HE station to transmit the packet including the field that indicates the second duration on a channel indicated in the resource map in an uplink transmission opportunity to the master station in accordance with at least one from the following group:
        orthogonal frequency division multiple-access (OFDMA) and multiple-user multiple-input multiple-output (MU-MIMO); and
    configure the HE station to enter a power saving mode if the packet is a predetermined duration shorter than the second duration.

2. The apparatus of claim 1, wherein the field that indicates the second duration is one of the following group:
    a legacy signal field, media access control duration of a media access control (MAC) Protocol Data Unit (MPDU), and an aggregate MPDU (A-MPDU).

3. The apparatus of claim 1, wherein the second duration is the first duration minus a duration for a preamble duration, a physical header duration, two short interframe spaces duration, and a multi-user block acknowledgement duration, and wherein the preamble duration is a duration of a preamble of the packet and the physical header duration is a duration of a physical header of the packet.

4. The apparatus of claim 1, wherein the second duration is determined to extend to one short interframe space before the master station transmits an acknowledgement of the packet.

5. The apparatus of claim 1, wherein the second duration is determined to extend to an end of a largest duration the packet is permitted to be for the transmission opportunity.

6. The apparatus of claim 1, wherein the trigger frame is transmitted to a plurality of HEW stations by the master station.

7. The apparatus of claim 1, wherein the circuitry is further configured to enter a power saving mode after the packet is transmitted and to awake from the power saving mode after the second duration if the packet is the predetermined duration shorter than the second duration.

8. The apparatus of claim 1, wherein the packet includes a legacy short-training field (L-STF), a legacy long-training field (L-LTF), a legacy signal field (L-SIG), and a media access control duration of an aggregate media access control (MAC) Protocol Data Unit (MPDU).

9. The apparatus of claim 1, wherein the master station does not know an amount of data the HEW station has to transmit in the packet.

10. The apparatus of claim 1, wherein the circuitry is further configured to:
transmit with a 4× symbol duration compared with an Institute of Electronic and Electrical Engineers (IEEE) 802.11ac symbol duration.

11. The apparatus of claim 1, further comprising memory coupled to the circuitry.

12. The apparatus of claim 11, further comprising one or more antennas coupled to the circuitry.

13. A method performed by an apparatus of a high-efficiency (HE) station, the method comprising:
receiving a trigger frame from a HE master station, wherein the trigger frame comprises a first duration and a resource map;
determining a second duration based on the first duration, wherein the second duration is indicated in a legacy portion of the packet;
configuring the HE station to transmit the packet with the second duration on a channel indicated in the resource map in an uplink transmission opportunity to the master station in accordance with at least one from the following group:
orthogonal frequency division multiple-access (OFDMA) and multiple-user multiple-input multiple-output (MU-MIMO; and
configuring the HE station to enter a power saving mode if the packet is a predetermined duration shorter than the second duration.

14. The method of claim 13, wherein the second duration is the first duration minus a duration for a preamble length, a physical header duration, two short interframe spaces duration, and a multi-user block acknowledgement duration, wherein the preamble duration is a duration of a preamble of the packet and the physical header duration is a duration a physical header of the packet.

15. The method of claim 13, wherein the second duration is determined to extend to one short interframe space before the master station transmits an acknowledgement of the packet.

16. The method of claim 13, wherein the second duration is determined to extend to an end of a largest duration the packet is permitted to be for the transmission opportunity.

17. A non-transitory, computer-readable storage medium that stores instructions for execution by one or more processors to perform operations for communication by an apparatus of a high-efficiency HE station, the instructions to configure the one or more processors to cause the apparatus to:
decode a trigger frame from a HE master station, wherein the trigger frame comprises a first duration and a resource map;
determine a second duration based on the first duration, wherein the second duration is indicated in a legacy portion of the packet;
configure the HE station to transmit the packet with the second duration on a channel indicated in the resource map in an uplink transmission opportunity to the master station in accordance with at least one from the following group:
orthogonal frequency division multiple-access (OFDMA) and multiple-user multiple-input multiple-output (MU-MIMO; and
configure the HE station to enter a power saving mode if the packet is a predetermined duration shorter than the second duration.

18. The non-transitory, computer readable storage medium of claim 17, wherein the second duration is the first duration minus a duration for a preamble length, a physical header duration, minus two short interframe spaces duration, and a multi-user block acknowledgement duration, wherein the preamble duration is a duration of a preamble of the packet and the physical header duration is a duration a physical header of the packet.

* * * * *